(12) United States Patent
Sato (10) Patent No.: US 8,508,817 B2
(45) Date of Patent: Aug. 13, 2013

(54) IMAGE READING APPARATUS AND CONTROL METHOD THEREOF

(75) Inventor: Ayaka Sato, Kashiwa (JP)

(73) Assignee: Canon Denshi Kabushiki Kaisha, Saitama-Ken (JP)

( * ) Notice: Subject to any disclaimer, the term of this patent is extended or adjusted under 35 U.S.C. 154(b) by 813 days.

(21) Appl. No.: 12/640,736

(22) Filed: Dec. 17, 2009

(65) Prior Publication Data

US 2010/0157391 A1 Jun. 24, 2010

(30) Foreign Application Priority Data

Dec. 24, 2008 (JP) ................................. 2008-327764
Dec. 16, 2009 (JP) ................................. 2009-284734

(51) Int. Cl.
*H04N 1/04* (2006.01)
*G06F 3/12* (2006.01)
*G03G 15/00* (2006.01)

(52) U.S. Cl.
USPC .......... 358/498; 358/474; 358/1.13; 358/488; 358/494; 358/486; 399/87; 399/16

(58) Field of Classification Search
USPC ................. 358/498, 486, 474, 461, 406, 504; 399/367, 373, 113, 392, 125; 271/162, 9.09
See application file for complete search history.

(56) References Cited

U.S. PATENT DOCUMENTS

| | | | | |
|---|---|---|---|---|
| 5,444,554 A | * | 8/1995 | Muramatsu et al. | 358/494 |
| 6,384,940 B1 | * | 5/2002 | Kawai et al. | 358/474 |
| 6,456,801 B1 | * | 9/2002 | Sakurai | 399/16 |
| 6,483,999 B1 | * | 11/2002 | Andersen et al. | 399/87 |
| 7,248,378 B2 | * | 7/2007 | Shiraishi | 358/1.13 |
| 7,552,922 B2 | * | 6/2009 | Terada | 271/162 |
| 7,564,601 B2 | * | 7/2009 | Angal et al. | 358/504 |
| 7,860,445 B2 | * | 12/2010 | Suzuki | 399/367 |
| 7,959,149 B2 | * | 6/2011 | Matsumoto | 271/162 |
| 2002/0097450 A1 | * | 7/2002 | Yokota et al. | 358/474 |
| 2004/0000752 A1 | * | 1/2004 | Hsu et al. | 271/264 |
| 2006/0170989 A1 | * | 8/2006 | Kim | 358/498 |
| 2007/0047026 A1 | * | 3/2007 | Shiokawa et al. | 358/486 |
| 2009/0086286 A1 | * | 4/2009 | Tojo | 358/488 |
| 2011/0043870 A1 | * | 2/2011 | Watanabe et al. | 358/474 |

FOREIGN PATENT DOCUMENTS

JP     3639614     2/2005

* cited by examiner

*Primary Examiner* — Akwasi M Sarpong (74) *Attorney, Agent, or Firm* — Fitzpatrick, Cella, Harper & Scinto (57) ABSTRACT

An image reading apparatus enabling a user to place originals on any of sheet feed trays without confirming requested orientation of the originals, either front facing or back facing. Image data of an original fed from a first sheet feed tray and read by a first reading unit is processed handling as image data of a front surface of the original, and image data of an original fed from the first sheet feed tray and read by a second reading unit is processed handling as image data of a back surface thereof. Image data of an original fed from a second sheet feed tray and read by the first reading unit is processed handling as image data of the back surface of the original, and image data of an original fed from the second sheet feed tray and read by the second reading unit is processed handling as image data of the front surface thereof.

8 Claims, 7 Drawing Sheets

IMAGE READING APPARATUS AND CONTROL METHOD THEREOF

BACKGROUND OF THE INVENTION

1. Field of the Invention

The present invention relates to an image reading apparatus having a plurality of sheet feed trays on each of which originals are placed, and relates to a control method of the image reading apparatus.

2. Description of the Related Art

Figure 6:
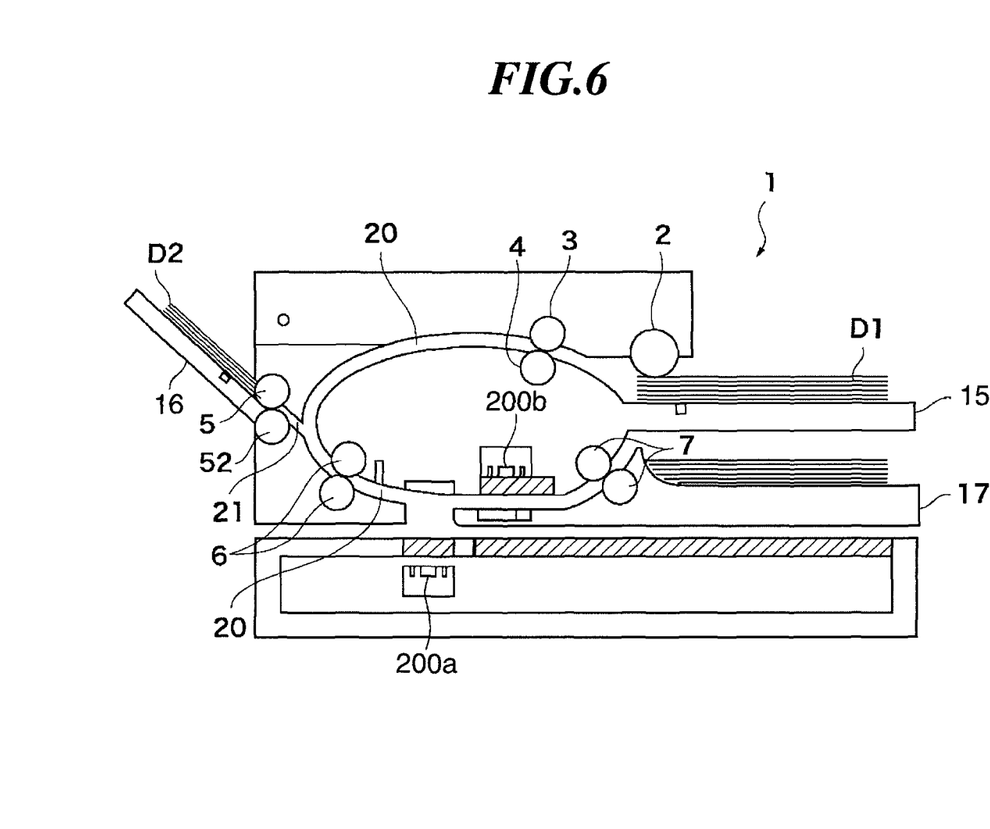
FIG. 6 is a schematic section view of a conventional image reading apparatus.

Conventionally, an image reading apparatus having sheet feed trays on which originals are placed has been known (see, e.g., Japanese Patent Publication No. 3639614). An example image reading apparatus of this type is shown in FIG. 6 that has a substantially U-shaped main conveying path 20 and a confluent conveying path 21 merging with the main conveying path 20 at an intermediate portion of the main conveying path 20.

A sheet feed tray 15 is disposed at an upstream end of the main conveying path 20, and a sheet feed tray 16 is disposed at an upstream end of the confluent conveying path 21. On the downstream side of the position where the confluent conveying path 21 merges with the main conveying path 20, a pair of reading sensors 200a, 200b are disposed on a lower side of and on an upper side of the conveying path.

Originals D1 placed on the sheet feed tray 15 are picked up by a pickup roller 2 and separated and fed one by one by a feed roller 3 and a retard roller 4 toward the main conveying path 20. Each original D1 fed to the main conveying path 20 makes a U-turn and is then conveyed by a conveying roller pair 6 to the downstream side of the main conveying path 20, and images of both sides of the original D1 are read by the pair of reading sensors 200a, 200b. Subsequently, the original D1 is discharged by a sheet discharge roller pair 7 to a sheet discharge tray 17.

Originals D2 on the sheet feed tray 16 are separated and fed one by one by a feed roller 5 and a retard roller 52 to the main conveying path 20 via the confluent conveying path 21. Each original D2 fed to the main conveying path 20 is conveyed by the sheet conveying roller pair 6 to the downstream side of the main conveying path 20, and images of both sides of the original D2 are read by the reading sensors 200a, 200b. Then, the original D2 is discharged to the sheet discharge tray 17 by the sheet discharge roller pair 7.

Irrespective of whether an original is picked up from the sheet feed tray 15 or from the sheet feed tray 16, image data read by the lower side reading sensor 200a is handled as front side image data of the original, and image data read by the upper side reading sensor 200b is handled as back side image data of the original.

Specifically, in the case of reading images of both sides of each original, an image of a surface, upwardly directed on the sheet feed tray 15, of an original D1 picked up from the sheet feed tray 15 is read as an image of front surface of the original D1 by the lower side reading sensor 200a, and an image of a surface, downwardly directed on the sheet feed tray 16, of an original D2 picked up from the sheet feed tray 16 is read as an image of front surface of the original D2 by the lower side reading sensor 200a. Also in the case of reading an image of one side of each original, which of original surfaces (i.e., the original surface upwardly directed on each sheet feed tray or the original surface downwardly directed thereon) is read differs between the sheet feed trays for the same reason.

Accordingly, at the time of double-sided reading with the image reading apparatus shown in FIG. 6, the user placing originals on one or both of the sheet feed trays 15, 16 must confirm, for each sheet feed tray, whether the original surface upwardly directed on the sheet feed tray will be read as front surface or as back surface. Similarly, at the time of single-sided reading, the user placing originals on one or both of the sheet feed trays 15, 16 must confirm, for each sheet feed tray, which of original surfaces (i.e., the surface upwardly directed on each sheet feed tray or the surface downwardly directed thereon) will be read. The above situation lowers the user-friendliness.

As described above, the user-friendliness of an image reading apparatus having sheet feed trays is lowered in a case where an image of the original surface upwardly directed on one sheet feed tray is read as an image of front surface and an image of the original surface upwardly directed on another sheet feed tray is read as an image of back surface. To attempt to obviate this, the image reading apparatus may have a changeover function which, at the time of double-sided reading, enables handling of original's front side image data as back side image data and handling of original's back side image data as front side image data. Even in that case, an operation to select the sheet feed tray to which the changeover function is to be applied must be made via an external apparatus (e.g., PC) connected to the image reading apparatus or an operation unit of the image reading apparatus, and then an operation to enable the changeover function must be done. In this way, the user must first confirm the correct orientation (either front facing or back facing) in placing originals on each sheet feed tray, secondly select the sheet feed tray to which the changeover function is to be applied, and thirdly perform the operation to enable the changeover function. Thus, user-friendliness is still missing.

At single-sided reading of, e.g., originals printed on one surfaces thereof, the other original surfaces printed with no images, letters, etc. are wastefully read, if the originals are placed in a wrong orientation. In that case, the originals must again be placed directing the original surfaces printed with images, etc. in the correct direction and the reading operation must be performed again.

SUMMARY OF THE INVENTION

The present invention provides an image reading apparatus and a control method thereof, which are capable of unifying requested directions of originals on plural sheet feed trays, front surfaces are upwardly directed or back surfaces are upwardly directed.

According to a first aspect of this invention, there is provided an image reading apparatus having first and second sheet feed trays, comprising a first reading unit adapted to read image data of an original fed to a conveying path from the first sheet feed tray, from an original's surface upwardly directed on the first sheet feed tray, and adapted to read image data of an original fed to the conveying path from the second sheet feed tray, from an original's surface downwardly directed on the second sheet feed tray, a second reading unit adapted to read image data of an original fed to a conveying path from the first sheet feed tray, from an original's surface downwardly directed on the first sheet feed tray, and adapted to read image data of an original fed to the conveying path from the second sheet feed tray, from an original's surface upwardly directed on the second sheet feed tray, a determination unit adapted to determine whether an original has been fed from the first sheet feed tray or from the second sheet feed tray, and a control unit adapted to control processing of image data of the original read by the first reading unit, handling as image data of a first surface of the original, and processing of image data of the original read by the second reading unit, handling as image data of a second surface of the original, in a case where reading of both surfaces of the original is performed, based on determination by the determination unit that the original has been fed from the first sheet feed tray, and adapted to control processing of the image data of the original read by the first reading unit, handling as the image data of the second surface of the original, and processing of the image data of the original read by the second reading unit, handling as the image data of the first surface of the original, in a case where reading of both surfaces of the original is performed, based on determination by the determination unit that the original has been fed from the second sheet feed tray.

According to a second aspect of this invention, there is provided an image reading apparatus having first and second sheet feed trays, comprising a first reading unit adapted to read image data from a surface of an original, a second reading unit adapted to read image data from another surface of the original opposite from the surface read by the first reading unit, and a determination unit adapted to determine whether an original has been fed from the first sheet feed tray or from the second sheet feed tray, wherein based on determination by the determination unit that the original has been fed from the first sheet feed tray, the image data of the original is read by the first reading unit, and based on determination by the determination unit that the original has been fed from the second sheet feed tray, the image data of the original is read by the second reading unit.

According to a third aspect of this invention, there is provided a control method of an image reading apparatus including first and second sheet feed trays, a first reading unit adapted to read image data of an original fed to the conveying path from the first sheet feed tray, from an original's surface upwardly directed on the first sheet feed tray, and adapted to read image data of an original fed to the conveying path from the second sheet feed tray, from an original's surface downwardly directed on the second sheet feed tray, and a second reading unit adapted to read image data of an original fed to the conveying path from the first sheet feed tray, from an original's surface downwardly directed on the first sheet feed tray, and adapted to read image data of an original fed to the conveying path from the second sheet feed tray, from an original's surface upwardly directed on the second sheet feed tray, which comprises a determination step of determining whether an original has been fed from the first sheet feed tray or from the second sheet feed tray, and a control step of controlling processing of image data of the original read by the first reading unit, handling as image data of a first surface of the original, and processing of image data of the original read by the second reading unit, handling as image data of a second surface of the original, in a case where reading of both surfaces of the original is performed, based on determination in the determination step that the original has been fed from the first sheet feed tray, and of controlling processing of image data of the original read by the first reading unit, handling as the image data of the second surface of the original, and processing of image data of the original read by the second reading unit, handling as the image data of the first surface of the original, in a case where reading of both surfaces of the original is performed, based on determination in the determination step that the original has been fed from the second sheet feed tray.

According to a fourth aspect of this invention, there is provided a control method of an image reading apparatus including first and second sheet feed trays, a first reading unit adapted to read image data from a surface of an original, and a second reading unit adapted to read image data from a surface opposite from the surface of the original read by the first reading unit, which comprises a determination step of determining whether an original has been fed from the first sheet feed tray or from the second sheet feed tray, and a reading step of reading the image data of the original by the first reading unit based on determination in the determination step that the original has been fed from the first sheet feed tray, and of reading the image data of the original by the second reading unit based on determination in the determination step that the original has been fed from the second sheet feed tray.

With the present invention, it is unnecessary to perform an operation to confirm whether original surfaces upwardly directed on sheet feed trays will be read as front surfaces or back surfaces when placing originals on the sheet feed trays.

Further features of the present invention will become apparent from the following description of exemplary embodiments with reference to the attached drawings.

DETAILED DESCRIPTION OF THE PREFERRED EMBODIMENTS

The present invention will now be described in detail below with reference to the drawings showing preferred embodiments thereof.

Figure 1:
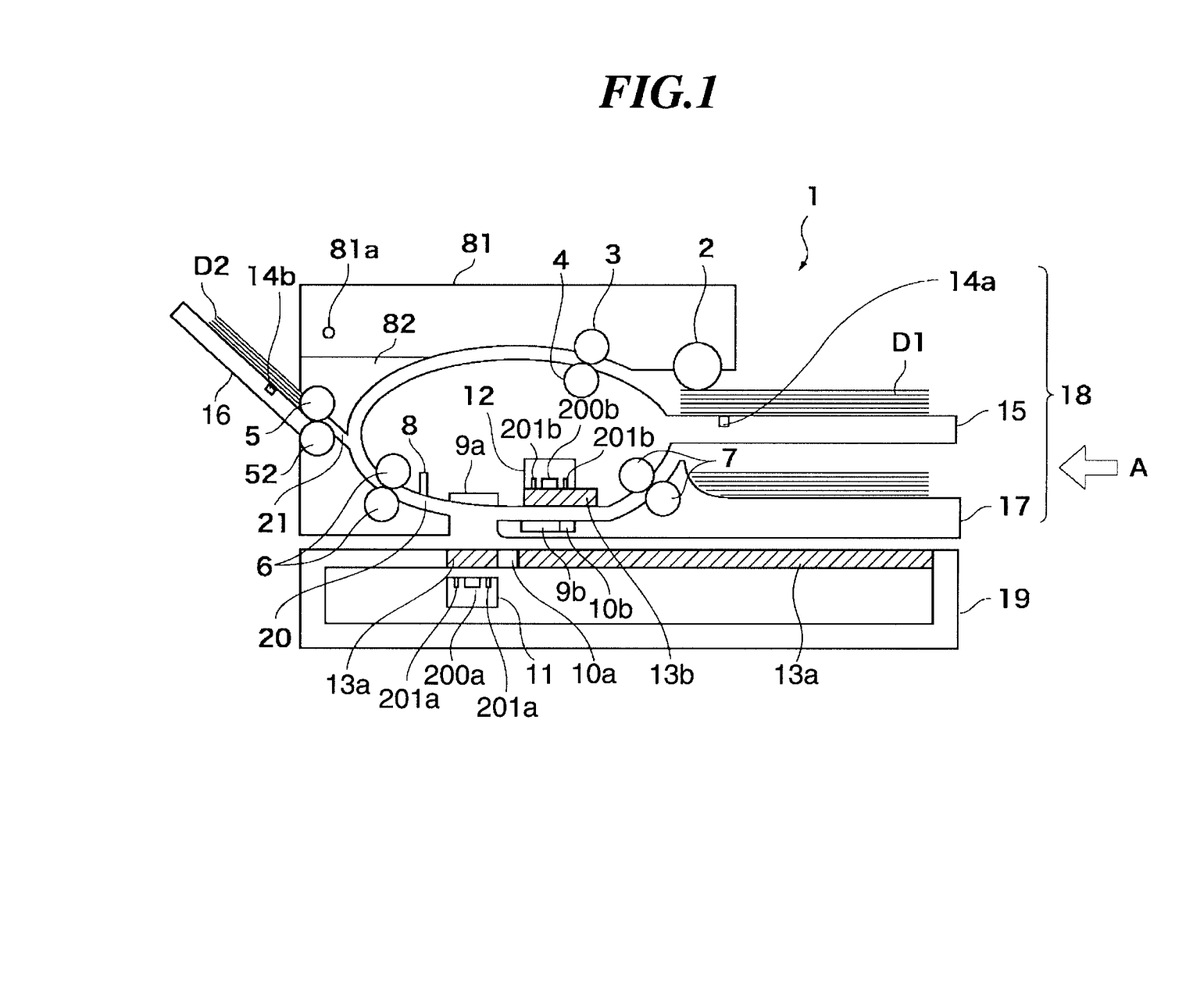
FIG. 1 is a schematic section view for explaining an image reading apparatus according to one embodiment of this invention.
Figure 2:
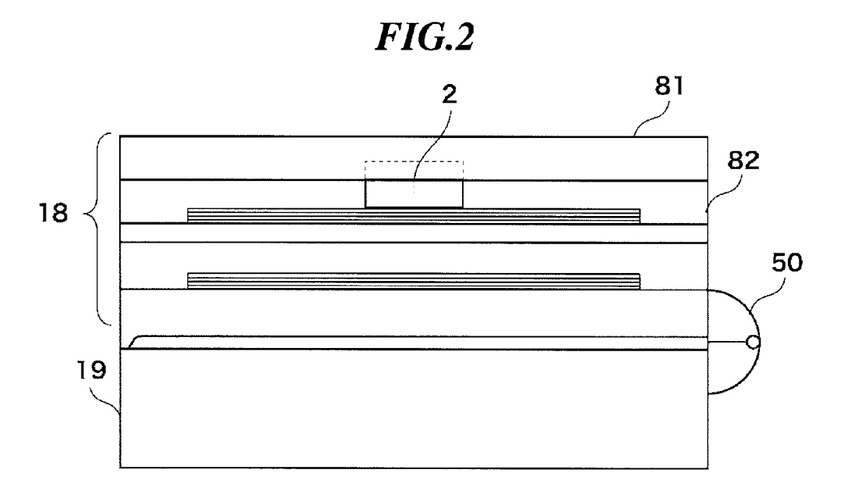
FIG. 2 is a view of the image reading apparatus as seen from a direction indicated by arrow A in FIG. 1.

FIG. 1 schematically shows in cross section an example image reading apparatus according to one embodiment of this invention, and FIG. 2 shows the image reading apparatus as seen from a direction indicated by arrow A in FIG. 1.

As shown in FIG. 1, the image reading apparatus 1 of this embodiment has a substantially U-shaped main conveying path 20 and a confluent conveying path 21 merging with the main conveying path 20 at an intermediate portion of the main conveying path 20.

A first sheet feed tray 15 on which one or more originals D1 are placed is disposed at an upstream end of the main conveying path 20. A second sheet feed tray 16 on which one or more originals D2 are placed is disposed on an upstream end of the confluent conveying path 21. The first sheet feed tray 15 is provided with a sheet detecting sensor 14a for detecting whether the original D1 is present, and the second sheet feed tray 16 is provided with a sheet detecting sensor 14b for detecting whether the original D2 is present.

Figure 7:
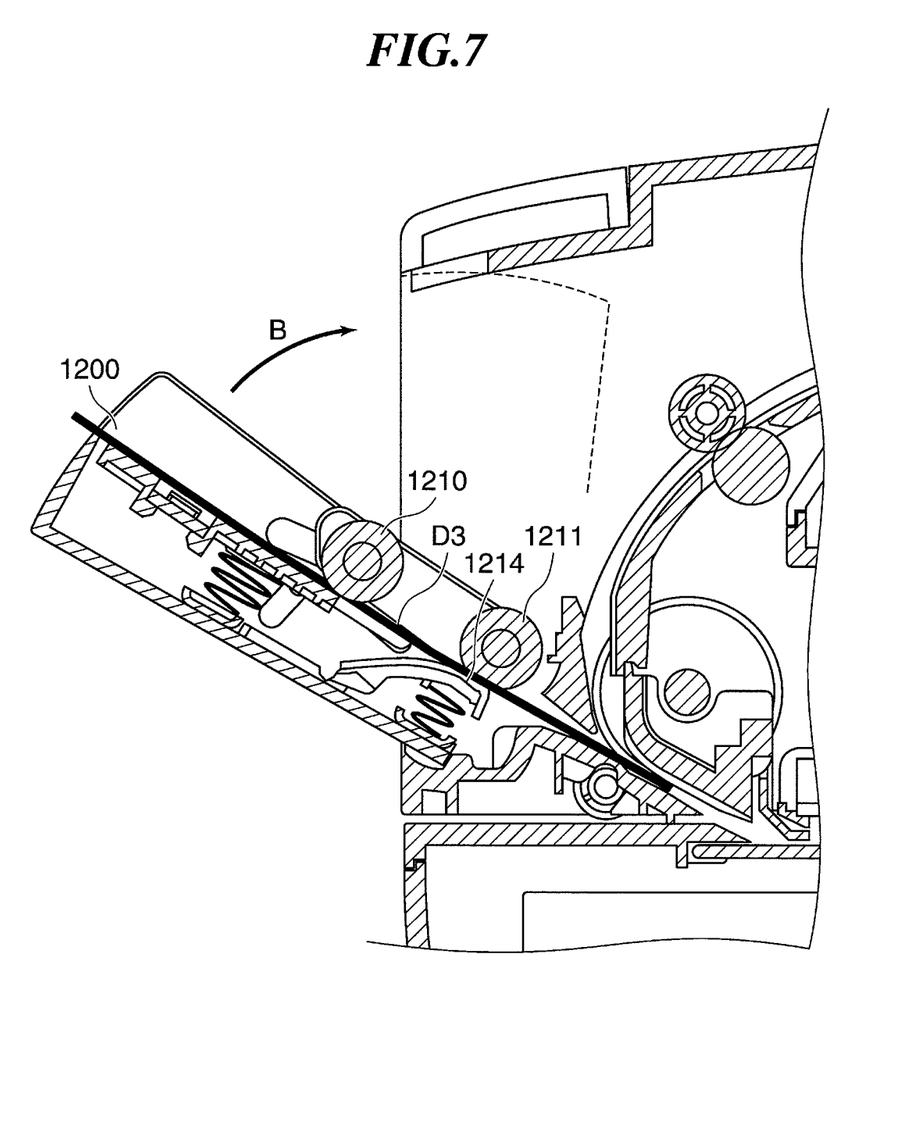
FIG. 7 is a fragmentary enlarged section view of a name card feeding tray, which is an example of a second sheet feed tray in FIG. 1.
Figure 8:
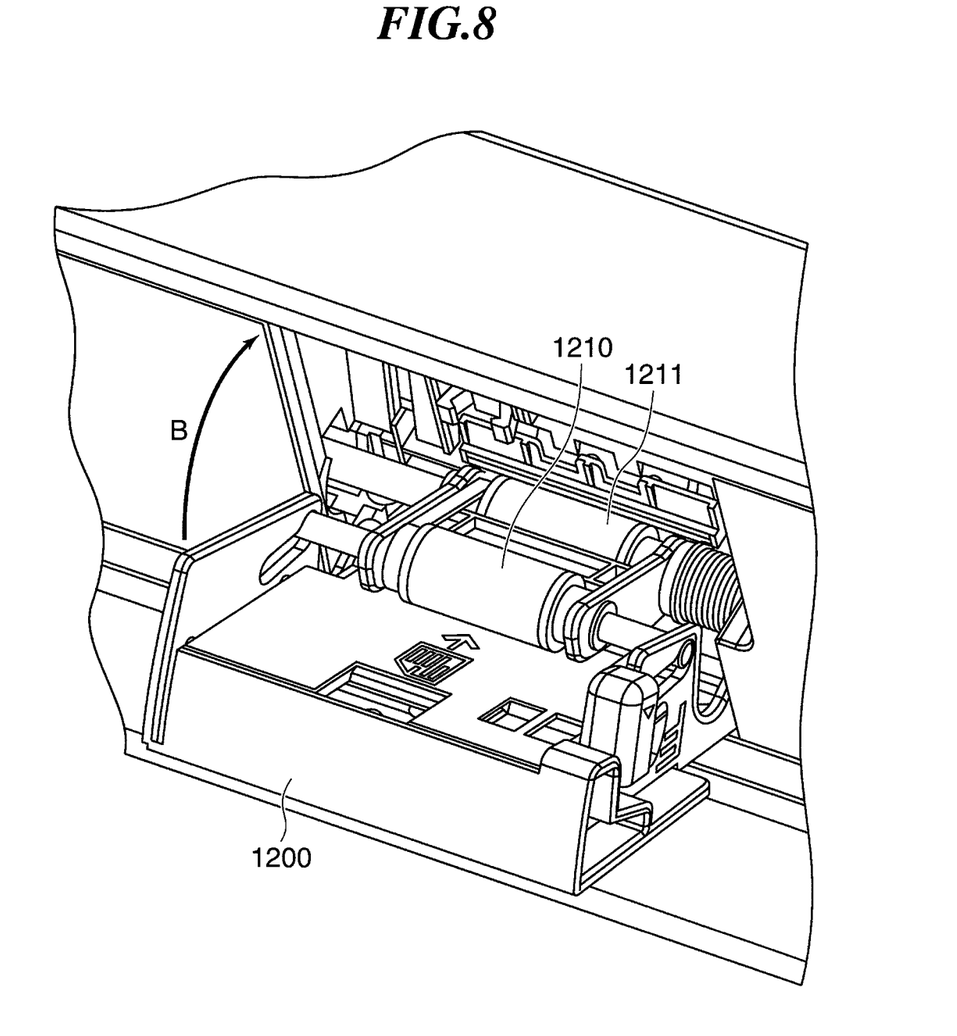
FIG. 8 is a fragmentary enlarged perspective view of the name card feeding tray.

The second sheet feed tray 16 of this embodiment can be constituted by a name card feeding tray 1200 shown in FIGS. 7 and 8. The name card feeding tray 1200 is supported by a support shaft (not shown) so as to be pivotable as shown by arrow B in FIGS. 7 and 8, and can be stored inside the image reading apparatus as shown by a dotted line in FIG. 7. Name cards D3 placed on the name card feeding tray 1200 are picked up by a pickup roller 1210 and fed one by one by a feed roller 1211 and a separation pad 1214. Originals which are each substantially equal in width to the name card can be fed from the name card feeding tray 1200. The name card feeding tray 1200 can of course be configured to feed originals which are narrower in width than the name card.

Referring to FIG. 1 again, a first reading unit 11 is disposed on a lower side of the main conveying path 20 at a location downstream of a position where the confluent conveying path 21 merges with the main conveying path 20. A second reading unit 12 is disposed on an upper side of the main conveying path 20 at a location downstream of the first reading unit 11.

A contact glass 13a is disposed at a position of the reading unit 11 facing the main conveying path 20. A contact glass 13b is disposed at a position of the reading unit 12 facing the main conveying path 20. An opposing member, e.g., a black-colored opposing member 9a, is disposed at an opposite position, facing the contact glass 13a of the first reading unit 11, of the main conveying path 20 between the opposing member 9a and the contact glass 13a. An opposing member, e.g., a black-colored opposing member 9b, is disposed at a position, facing the contact glass 13b of the second reading unit 12, of the main conveying path 20 therebetween.

A registration sensor 8 for detecting an original being conveyed along the main conveying path 20 is disposed between the opposing member 9a facing the contact glass 13a on the side of the first reading unit 11 and the position where the confluent conveying path 21 merges with the main conveying path 20.

At a location downstream of the opposing member 9b facing the contact glass 13b on the side of the second reading unit 12, a reference member, e.g., a white-colored reference member 10b, is disposed adjacent to the opposing member 9b. A reference member, e.g., a white-colored reference member 10a, is disposed between upstream- and downstream-side portions of the contact glass 13a on the side of the first reading unit 11.

At a position of the contact glass 13a on the side of the first reading unit 11, the image reading apparatus 1 is divided into upper and lower units 18, 19. The upper unit 18 is supported via a hinge 50 (FIG. 2) for being opened and closed relative to the lower unit 19. To read originals (e.g., a book) which cannot be separated and cannot be fed one by one to the main conveying path 20, the upper unit 18 is opened and then a desired original is made in contact with the contact glass 13a on the side of the first reading unit 11, whereby an image of the original can be read.

The upper unit 18 is comprised of upper and lower frames 81, 82. The upper frame 81 is supported by a pivot shaft 81a so as to be openable and closable. When, e.g., an original jam occurred in the main conveying path 20, the upper frame 81 can be opened to remove the jammed original from the main conveying path 20.

The first reading unit 11 includes a light source 201a that irradiates light onto an original being conveyed along the main conveying path 20, and a line image sensor 200a that receives light reflected from the original and reads an image of the original. The second reading unit 12 includes a light source 201b that irradiates light onto an original being conveyed along the main conveying path 20, and a line image sensor 200b that receives light reflected from the original and reads an image of the original.

The light sources 201a, 201b have illumination unevennesses, and the line image sensors 200a, 200b have sensitivity unevennesses. Thus, shading correction data is stored in advance, which is created by moving the reading units 11, 12 to positions facing the reference members 10a, 10b and by reading the reference members 10a, 10b by the line image sensors 200a, 200b. The shading correction data is used to perform shading correction to correct unevenness of a read image on a per pixel basis, which is caused due to, e.g., the illumination unevennesses of the light sources 201a, 201b and the sensitivity unevennesses of the line image sensors 200a, 200b. In the shading correction, an illumination adjustment to adjust an amount of light emitted from the light sources 201a, 201b to an appropriate amount and a gain adjustment to adjust gains of image output signals from the line image sensors 200a, 200b to optimum gains are also performed.

To read images of both sides of originals, the reference member 10a is first read by the line image sensor 200a of the first reading unit 11, and shading correction data to correct, on a per pixel basis, image data read by the first reading unit 11 is created and stored. The reference member 10b is also read by the line image sensor 200b of the second reading unit 12, and shading correction data to correct, on a per pixel basis, image data read by the second reading unit 12 is created and stored.

Subsequently, originals D1 placed on the first sheet feed tray 15 are picked up by the pickup roller 2 and separated and fed one by one by the feed roller 3 and the retard roller 4 toward the main conveying path 20. When each original D1, after doing a U-turn, is conveyed by the conveying roller pair 6 along the main conveying path 20, the original D1's surface which was upwardly directed on the first sheet feed tray 15 is downwardly directed. And the line image sensor 200a of the first reading unit 11 reads an image from the original D1's surface which was upwardly directed on the first sheet feed tray 15. The shading correction is performed on image data created from an image signal of the line image sensor 200a of the first reading unit 11 with reference to the stored shading correction data for the first reading unit 11.

The original D1 whose image has been read by the first reading unit 11 is conveyed toward downstream. The line image sensor 200b of the second reading unit 12 reads an image from the original D1's another surface which was downwardly directed on the first sheet feed tray 15. The shading correction is performed on image data created from an image output signal of the line image sensor 200b of the second reading unit 12 with reference to the stored shading correction data for the second reading unit 12.

The original D1 whose both side images have been read is further conveyed toward downstream by the sheet discharge roller pair 7 and discharged to the sheet discharge tray 17.

In the first reading unit 11, the line image sensor 200a starts reading an original image upon elapse of a time period of T1 seconds from when a leading end of the original has been detected by the registration sensor 8, and stops reading upon elapse of a time period of T2 (>T1) seconds from when the leading end has been detected.

The time period T1 represents a time period required for a leading end of an original to reach a reading position of the line image sensor 200a from when the leading end has been detected by the registration sensor 8, and the time period T2 represents a time period required for a rear end of the original to pass through the reading position of the line image sensor 200a from when the leading end has been detected by the registration sensor 8.

The time periods T1, T2 can be determined based on an original conveyance speed and a distance from the registration sensor 8 to the reading position of the line image sensor 200a. Similarly, timings of starting and stopping the reading of original image by the second reading unit 12 can be determined based on the original conveyance speed and a distance from the registration sensor 8 to a reading position of the line image sensor 200b.

Originals D2 placed on the second sheet feed tray 16 are separated and fed one by one by the feed roller 5 and the retard roller 52, and fed via the confluent conveying path 21 to the main conveying path 20. Each original D2 fed to the main conveying path 20 is conveyed toward downstream by the conveying roller pair 6, and the line image sensor 200a of the first reading unit 11 reads an image from the original D2's surface which was downwardly directed on the second sheet feed tray 16.

The original D2 whose image has been read by the first reading unit 11 is conveyed toward downstream, and the line image sensor 200b of the second reading unit 12 reads an image from the original D2's another surface which was upwardly directed on the second sheet feed tray 16. The original D2 whose both side images have been read is further conveyed downstream by the sheet discharge roller pair 7 and discharged to the sheet discharge tray 17.

Next, operations of the image reading apparatus 1 will be described with reference to FIG. 3 in which a control system is shown in block diagram.

Figure 3:
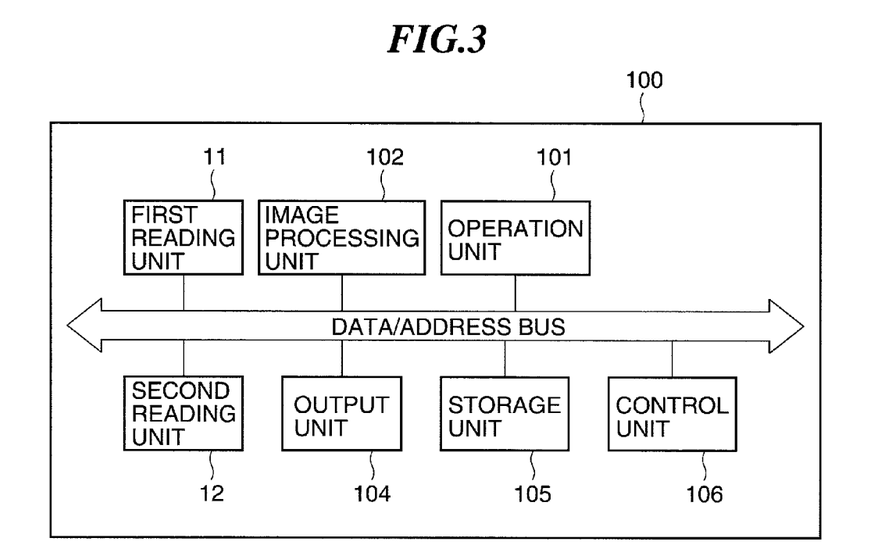
FIG. 3 is a block diagram showing a control system of the image reading apparatus.

In the control system 100 shown in FIG. 3, the light source 201a of the first reading unit 11 irradiates light onto an original being conveyed along the main conveying path 20, the line image sensor 200a photoelectrically converts light reflected from the original into an analog signal, and an A/D converter (not shown) converts the analog signal into digital data and outputs image data with predetermined bpp (bits per pixel).

In the second reading unit 12, the light source 201b irradiates light onto an original being conveyed along the main conveying path 20, the line image sensor 200b photoelectrically converts light reflected from the original into an analog signal, and an A/D converter (not shown) converts the analog signal into digital data and outputs image data with predetermined bpp.

An image processing unit 102 performs shading correction processing, sheet edge detection processing, image correction processing, etc. on the image data output from the reading units 11, 12.

A control unit 106 includes a CPU, a ROM, a RAM, etc. (none of which are shown). The ROM stores processing programs for controlling the image reading apparatus 1 and various data required for execution of the processing programs.

An output unit 104 includes, e.g., a communication I/F for communication with an external apparatus such as a PC. A storage unit 105 is constituted by a semiconductor memory, a hard disk, or the like. Image data is written into and read from the storage unit 105 under the control of the control unit 106.

An operation unit 101 is a user interface via which instructions are input to the image reading apparatus 1. For example, as for selection of whether both side images of originals are to be read or one side images of originals are to be read, an instruction is given by a user's manipulation on the operation unit 101. It should be noted that the instruction for selection and other instructions can be given from the external apparatus (e.g., PC) connected to the output unit 104.

Figure 4:
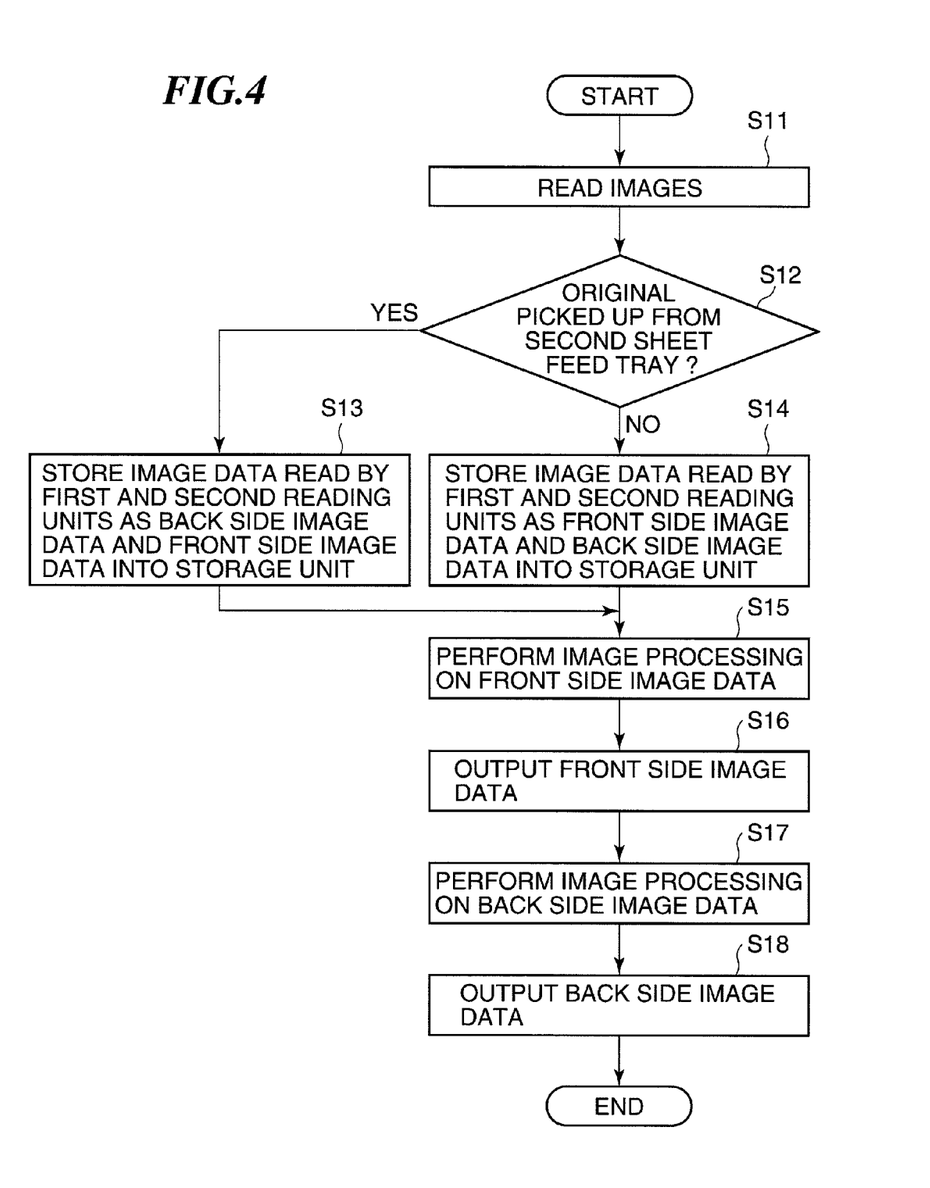
FIG. 4 is an exemplar flowchart for explaining a process performed by the image reading apparatus to read both side images of an original.

Next, with reference to FIG. 4, a description will be given of an exemplar reading process where the image reading apparatus 1 reads both side images of an original. Each process in FIG. 4 is performed by the CPU of the control unit 106 by loading one or more programs stored in the ROM or the hard disk into the RAM and executing the loaded programs.

In step S11, the CPU causes the reading units 11, 12 to read both side images of an original being conveyed along the main conveying path 20, and then proceeds to step S12.

In step S12, based on sheet feed tray selection information supplied from the connected external apparatus (e.g., PC) or based on detection information from the sheet detecting sensors 14a, 14b representing whether originals are placed on the sheet feed trays, the CPU determines whether the original fed to the main conveying path 20 has been picked up from the second sheet feed tray 16 or not. When determining that the original has been picked up from the second sheet feed tray 16, the CPU proceeds to step S13. Otherwise, the CPU determines that the original has been picked up from the first sheet feed tray 15 and proceeds to step 514.

In step S13, the CPU having determined that the original D2 has been picked up from the second sheet feed tray 16 stores image data read by the first reading unit 11 into the storage unit 105 handling as back side image data of the original D2. The CPU also stores image data read by the second reading unit 12 into the storage unit 105 handling as front side image data of the original D2, and then proceeds to step S15.

In step S14, the CPU having determined that the original D1 has been picked up from the first sheet feed tray 15 stores image data read by the first reading unit 11 into the storage unit 105 handling as front side image data of the original D1. The CPU also stores image data read by the second reading unit 12 into the storage unit 105 handling as back side image data of the original D1, and proceeds to step S15. As described above, handling of read image data in step S14 is reversed from step S13.

In step S15, the CPU causes the image processing unit 102 to perform predetermined image processing on the front side image data stored in the storage unit 105, and proceeds to step S16.

In step S16, the CPU outputs the front side image data subjected to the image processing in step S15 to the external apparatus (e.g., PC) via the output unit 104, and proceeds to step S17.

In step S17, the CPU causes the image processing unit 102 to perform the predetermined processing on the back side image data stored in the storage unit 105, and proceeds to step S18.

In step S18, the CPU outputs the back side image data subjected to the image processing in step S17 to the external apparatus (e.g., PC) via the output unit 104, and completes the present process.

Figure 5:
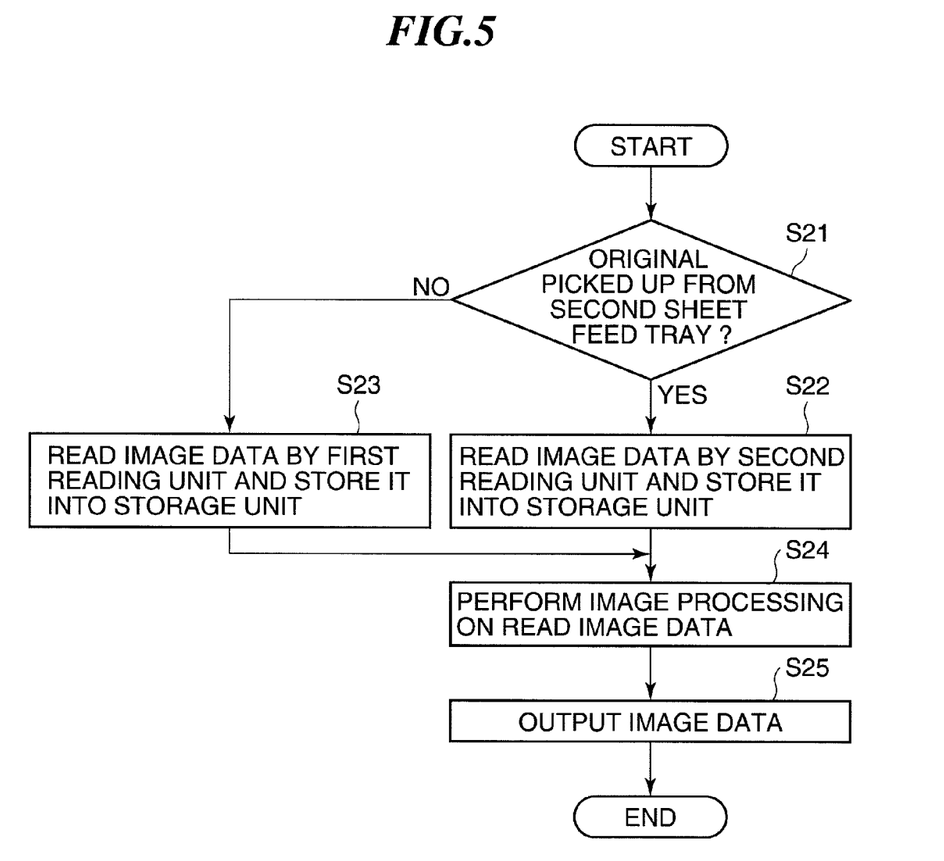
FIG. 5 is an exemplar flowchart for explaining a process performed by the image reading apparatus to read one side image of an original.

Next, with reference to FIG. 5, a description will be given of an exemplar process where the image reading apparatus 1 performs image reading of only one side of an original. Each process in FIG. 5 is performed by the CPU of the control unit 106 by loading one or more programs stored in the ROM or the hard disk into the RAM and executing the loaded programs.

In step S21, the CPU determines whether an original fed to the main conveying path 20 has been picked up from the second sheet feed tray 16 or not, and proceeds to step S22 when determining that the original has been picked up from the second sheet feed tray 16. Otherwise, the CPU determines that the original has been picked up from the first sheet feed tray 15, and proceeds to step S23.

In step S22, the CPU, having determined that the original D2 has been picked up from the second sheet feed tray 16, controls the second reading unit 12 to read an image of the original D2, stores the read image data into the storage unit 105, and proceeds to step S24. In that case, an image of upwardly-directed surface of the original D2 picked up from the second sheet feed tray 16 is read by the second reading unit 12.

In step S23, the CPU, having determined that the original D1 has been picked up from the first sheet feed tray 15, controls the first reading unit 11 to read an image of the original D1, stores the read image data into the storage unit 105, and proceeds to step S24. In that case, an image of the original D1's surface upwardly directed on the first sheet feed tray 15, from which the original D1 picked up, is read by the first reading unit 11.

In step S24, the CPU causes the image processing unit 102 to perform predetermined image processing on the image data read in step S22 or S23, and proceeds to step S25.

In step S25, the CPU outputs the image data subjected to the image processing in step S24 to the external apparatus (e.g., PC) via the output unit 104, and completes the present process.

As described above, according to this embodiment, in the case of reading both side images of originals, the original D1's surface and the original D2's surface which were upwardly directed on the sheet feed trays 15, 16 are processed as front side image data, and the original's surfaces downwardly directed on the sheet feed trays are processed as back side image data. In the case of reading one side images of originals, the original D1's surface and the original D2's surface which were upwardly directed on the sheet feed trays 15, 16 are read.

As a result, the orientation (either front facing or back facing) in placing original D1 on the sheet feed tray 15 and the orientation (either front facing or back facing) in placing original D2 on the sheet feed tray 16 can become the same to each other. Thus, it becomes possible to eliminate the need of confirming, for each of the originals D1, D2, whether which of the front sides and the back sides of the originals D1, D2 should be directed upwardly when placing the originals on the sheet feed trays. In other words, the originals D1, D2 can be placed with the same orientation on both the sheet feed trays 15, 16, whereby the user-friendliness can be improved.

This invention is not limited to the example described in the embodiment, and various changes and modifications may be made without departing from the spirit and scope of the invention.

For example, in the embodiment, in the case of reading both side images of originals, surfaces of originals D1, D2 upwardly directed on the sheet feed trays 15, 16 are read as front surfaces (first surfaces), whereas downwardly directed surfaces are read as back surfaces (second surfaces), but this is not limitative. For example, the first surface can be thought of as back surface, and the second surfaces can be thought of as front surface. Specifically, the surfaces of the originals D1, D2 upwardly directed on the sheet feed trays 15, 16 can be read as the back surfaces (first surfaces), and downwardly directed surfaces can be read as the front surfaces (second surfaces).

In the embodiment, in the case of reading one side images of originals, surfaces of originals D1, D2 upwardly directed on the sheet feed trays 15, 16 are read. Alternatively, image reading apparatus may read downwardly directed surfaces, not upwardly directed surfaces, of originals in the case of reading one side images of originals.

In an operation of reading both side images of originals, the process of FIG. 4 which handles the image data read by same reading unit differently according to the sheet feed tray, from which the corresponding original has been picked up, may not be carried out. And that case is also included in this invention. For example, in the case of reading one side images of originals, the process like FIG. 5 is performed, whereas in the case of reading both side images of originals, the process like FIG. 4 is not performed. Or, for example, in the case of reading one side images of originals without enabling change to the process which performs image reading of both sides of originals. In such cases, according to this invention, it is possible to carry out, e.g., the process in steps S21 to S23 in FIG. 5, in which the reading unit to be used to read image data is changed according to whether the corresponding original has been picked up from the sheet feed tray 15 or from the sheet feed tray 16. It should be noted that a part or all of the image data processing in this invention can be carried out by a hardware circuit.

The image data processing in this invention can be carried out by an external apparatus, e.g., a PC, connected to the image reading apparatus. In that case, a system including the image reading apparatus and the external apparatus corresponds to the image reading apparatus of this invention.

In the embodiment, this invention is applied to a single function image reading apparatus having an image reading function. However, this invention is also applicable to, e.g., an image reading apparatus mounted on an image forming apparatus such as a copying machine or a printer.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2008-327764, filed Dec. 24, 2008, which is hereby incorporated by reference herein in its entirety.

What is claimed is:

1. An image reading apparatus comprising:
first and second sheet feed trays, and a conveying path;
a first reading unit constructed to read image data of an original fed to the conveying path from said first sheet feed tray, from an original's surface upwardly directed on said first sheet feed tray, and constructed to read image data of an original fed to the conveying path from said second sheet feed tray, from an original's surface downwardly directed on said second sheet feed tray;
a second reading unit constructed to read image data of an original fed to the conveying path from said first sheet feed tray, from an original's surface downwardly directed on said first sheet feed tray, and constructed to read image data of an original fed to the conveying path from said second sheet feed tray, from an original's surface upwardly directed on said second sheet feed tray;

a determination unit constructed to determine whether the original has been fed from said first sheet feed tray or from said second sheet feed tray; and a control unit constructed to control processing of image data of the original read by said first reading unit, handling as image data of a first surface of the original, and processing of image data of the original read by said second reading unit, handling as image data of a second surface of the original, in a case where reading of both surfaces of the original is performed, based on determination by said determination unit that the original has been fed from said first sheet feed tray, and constructed to control processing of the image data of the original read by said first reading unit, handling as the image data of the second surface of the original, and processing of the image data of the original read by said second reading unit, handling as the image data of the first surface of the original, in a case where reading of both surfaces of the original is performed, based on determination by said determination unit that the original has been fed from said second sheet feed tray, wherein said conveying path is substantially U-shaped, and said first sheet feed tray is disposed at an upstream end of said substantially U-shaped conveying path with respect to an intermediate turn-round portion of said substantially U-shaped conveying path, said second sheet feed tray is disposed at the intermediate turn-round portion of said substantially U-shaped conveying path, said first reading unit and said second reading unit are disposed at a downstream end of said substantially U-shaped conveying path with respect to the intermediate turn-round portion of said substantially U-shaped conveying path, the original on said second sheet feed tray is fed to said first reading unit and said second reading unit directly through the conveying path, and the original on said first sheet feed tray and the original on said second sheet feed tray are fed oppositely in direction to each other.

2. The image reading apparatus according to claim 1, wherein said control unit controls one of said first and second reading units so as to read image data of the original, in a case where reading of one surface of an original is performed, based on determination by said determination unit that the original has been fed from said first sheet feed tray, and controls another of said first and second reading units so as to read image data of the original, in a case where reading of one surface of an original is performed, based on determination by said determination unit that the original has been fed from said second sheet feed tray.

3. The image reading apparatus according to claim 1, wherein said conveying path includes a main conveying path, which is substantially U-shaped, and a confluent conveying path merging with the main conveying path at an intermediate portion of the main conveying path;

said first sheet feed tray is disposed at an upstream end of the main conveying path;

said second sheet feed tray is disposed at an upstream end of the confluent conveying path; and said first and second reading units are disposed downstream of a position where the confluent conveying path merges with the main conveying path.

4. The image reading apparatus according to claim 1, wherein originals that are substantially equal in width to a name card can be fed from said second sheet feed tray.

5. An image reading apparatus comprising:

first and second sheet feed trays, and a conveying path;

a first reading unit constructed to read image data from a surface of an original;

a second reading unit constructed to read image data from another surface of the original opposite from the surface read by said first reading unit; and a determination unit constructed to determine whether an original has been fed from said first sheet feed tray or from said second sheet feed tray, wherein based on determination by said determination unit that the original has been fed from said first sheet feed tray, the image data of the original is read by said first reading unit, and based on determination by said determination unit that the original has been fed from said second sheet feed tray, the image data of the original is read by said second reading unit, said conveying path is substantially U-shaped, and said first sheet feed tray is disposed at an upstream end of said substantially U-shaped conveying path with respect to an intermediate turn-round portion of said substantially U-shaped conveying path, said second sheet feed tray is disposed at the intermediate turn-round portion of said substantially U-shaped conveying path, said first reading unit and said second reading unit are disposed at a downstream end of said substantially U-shaped conveying path with respect to the intermediate turn-round portion of said substantially U-shaped conveying path, the original on said second sheet feed tray is fed to said first reading unit and said second reading unit directly through the conveying path, and the original on said first sheet feed tray and the original on said second sheet feed tray are fed oppositely in direction to each other.

6. The image reading apparatus according to claim 5, wherein originals that are substantially equal in width to a name card can be fed from said second sheet feed tray.

7. A control method of an image reading apparatus including first and second sheet feed trays, a conveying path, a first reading unit constructed to read image data of an original fed to the conveying path from said first sheet feed tray, from an original's surface upwardly directed on said first sheet feed tray, and constructed to read image data of an original fed to the conveying path from said second sheet feed tray, from an original's surface downwardly directed on said second sheet feed tray, and a second reading unit constructed to read image data of an original fed to the conveying path from said first sheet feed tray, from an original's surface downwardly directed on said first sheet feed tray, and constructed to read image data of an original fed to the conveying path from said second sheet feed tray, from an original's surface upwardly directed on the second sheet feed tray, wherein said conveying path is substantially U-shaped, and said first sheet feed tray is disposed at an upstream end of said substantially U-shaped conveying path with respect to an intermediate turn-round portion of said substantially U-shaped conveying path, said second sheet feed tray is disposed at the intermediate turn-round portion of said substantially U-shaped conveying path, said first reading unit and said second reading unit are disposed at a downstream end of said substantially U-shaped conveying path with respect to the intermediate turn-round portion of said substantially U-shaped conveying path, the original on said second sheet feed tray is fed to said first reading unit and said second reading unit directly through the conveying path, and the original on said first sheet feed tray and the original on said second sheet feed tray are fed oppositely in direction to each other, the control method comprising:

a determination step of determining whether an original has been fed from said first sheet feed tray or from said second sheet feed tray; and a control step of controlling processing of image data of the original read by said first reading unit, handling as image data of a first surface of the original, and processing of image data of the original read by said second reading unit, handling as image data of a second surface of the original, in a case where reading of both surfaces of the original is performed, based on determination in said determination step that the original has been fed from said first sheet feed tray, and of controlling processing of image data of the original read by said first reading unit, handling as the image data of the second surface of the original, and processing of image data of the original read by said second reading unit, handling as the image data of the first surface of the original, in a case where reading of both surfaces of the original is performed, based on determination in said determination step that the original has been fed from said second sheet feed tray.

8. A control method of an image reading apparatus including first and second sheet feed trays, a conveying path, a first reading unit constructed to read image data from a surface of an original, and a second reading unit constructed to read image data from a surface opposite from the surface of the original read by said first reading unit, wherein said conveying path is substantially U-shaped, and said first sheet feed tray is disposed at an upstream end of said substantially U-shaped conveying path with respect to an intermediate turn-round portion of said substantially U-shaped conveying path, said second sheet feed tray is disposed at the intermediate turn-round portion of said substantially U-shaped conveying path, said first reading unit and said second reading unit are disposed at a downstream end of said substantially U-shaped conveying path with respect to the intermediate turn-round portion of said substantially U-shaped conveying path, the original on said second sheet feed tray is fed to said first reading unit and said second reading unit directly through the conveying path, and the original on said first sheet feed tray and the original on said second sheet feed tray are fed oppositely in direction to each other, the control method comprising:

a determination step of determining whether an original has been fed from said first sheet feed tray or from said second sheet feed tray; and a reading step of reading the image data of the original by said first reading unit based on determination in said determination step that the original has been fed from said first sheet feed tray, and of reading the image data of the original by said second reading unit based on determination in said determination step that the original has been fed from said second sheet feed tray.

* * * * *